Feb. 24, 1931.  F. G. SCOTT  1,794,036
AMUSEMENT DEVICE
Filed Aug. 29, 1930
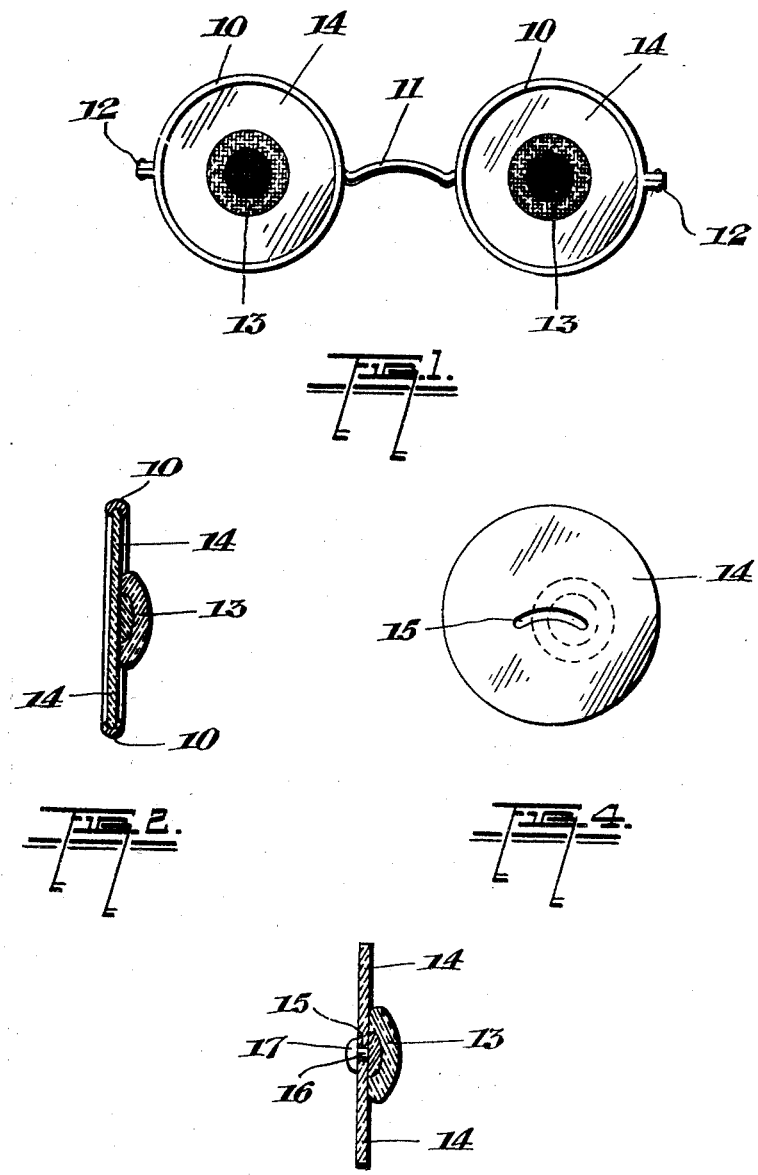
INVENTOR.
FREDERICK G. SCOTT.
BY Fetherstonhaugh & Co.
ATTY'S.

Patented Feb. 24, 1931

1,794,036

UNITED STATES PATENT OFFICE

FREDERICK GEORGE SCOTT, OF QUEBEC, QUEBEC, CANADA

AMUSEMENT DEVICE

Application filed August 29, 1930. Serial No. 478,697.

This invention relates to improvements in amusement devices, and an object of the invention is to provide a form of disguise, more particularly for the eyes, to entirely change the character of the face, which will provide a startling change in the appearance but which will permit the wearer to at the same time readily see his way about.

A further object of the invention is to provide a disguise of very simple character which will effect a complete change in appearance but will obviate the use of masks and the like which have a tendency to carry germs, impede breathing, and are generally uncomfortable.

A further object of the invention is to provide a device of this character which may be very cheaply manufactured and placed on the market at a very low cost.

With these and other objects in view the invention consists essentially of an eyeglass or pair of spectacles adapted to carry the representation of an eye in the form of an eyeball of a human or animal, either rigidly or movably fixed to the eye-piece of the article, or carried within the rim of the eyeglass or spectacle, but in such a manner as to provide a clear space for vision around the major portion of the article and yet conceal the natural eye of the wearer, as more fully described in the present specification and illustrated in the accompanying drawing which forms part of the same.

In the drawings:

Figure 1 is an elevation of a pair of spectacles showing the attachment applied thereto in normal position.

Figure 2 is a section through one of the eyeglasses showing the preferred form of the attachment and its relation to the eye-piece.

Figure 3 is an alternative form of the invention illustrating one manner in which the attachment could be adjustable.

Figure 4 is an elevation of the eye-piece showing the adjusting slot used in the alternative form of Figure 3.

Referring more particularly to the drawings, 10 illustrates a pair of spectacles formed with the usual nose piece 11 and side lugs 12 for the reception of the usual ear pieces attached in well known manner forming as a whole the spectacle frame. At any desirable point in the eye-piece 14, preferably centrally thereof, is secured the representation of an eye 13 in the form of an eyeball of a human or animal, which protrudes beyond the eye-piece 14 and frame of the spectacles or eyeglass. This structure will readily conceal the natural eye of the wearer of the spectacle and yet through the portion of the eye-piece 14 not covered by the eye-ball 13 will provide for clear vision on the part of the wearer so that he may readily see his way about.

The attached eye balls 13 as more particularly shown in Fig. 2, are preferably made as an artificial eye out of eye-piece 14, which will produce a most startling change in the appearance and in fact give the impression that it is the natural eye of the person in question. However, it will be readily understood that this "auxiliary eye ball" may be made from any other desirable materials which will produce a change of the character desired.

It is within the scope of the invention that these auxiliary eye balls 13 may be made movable in character and one manner of adjusting these pieces is illustrated in Figure 3 in which a slot 15 of any desirable character is provided in the eye-piece 14 of the spectacle or eyeglass and the eye ball 13 is attached by means of a small shank 16 and retaining piece 17 on the end of the shank so that this may be moved about to change the impression given. In Figure 4 the slot is shown as semi-circular, but different forms of slots could be employed and as a matter of fact other different forms of the attachment to make the eye balls adjustable could be employed.

Normally when the eye ball 13 is merely a fixed eye ball as in the preferred form of the invention, the eye ball is attached to the eye-piece 14 by means of a suitable cement. However, if it is found desirable to use a different type of eye ball and avoid the use of glass in the spectacle it will be readily seen that the eye ball could be carried within the rim of the spectacle and used in the same manner as previously described in connection with the use of the glass.

In use the spectacles or eyeglass, as the case may be, are donned by a person and the most startling change is effected in the wearer's appearance, giving the impression that the eye balls 13 are the natural eyes of the wearer, and depending upon the character of the eye balls 13 the appearance of the face may be varied as to assume a hideous character or humorous character as desired. Of course a luminescent compound may be readily used to give a startling result in the dark and the use of electrically illuminated eye balls is also within the scope of my invention.

Various modifications may be made in this invention without departing from the spirit thereof or the scope of the claims, and therefore the exact forms shown are to be taken as illustrative only and not in a limiting sense, and it is desired that only such limitations shall be placed thereon as are disclosed in the prior art or are set forth in the accompanying claims.

It is to be understood, however, that the term "frame" when used in the following claims is intended to cover the frame of an eyeglass or pair of spectacles. This term is to be interpreted as covering either a structure with an exterior facing of metal or other composition or any type of eyeglass or spectacles, whether made up solely of glass or a combination of glass and a frame of different material. It is also to be understood that the term "eyeball" or "artificial eye" may be interpreted as singular or plural.

I claim:

1. An amusement device comprising a disguise for the eyes, including a transparent unitary eye-piece and the representation of an eyeball covering a central portion thereof.

2. An amusement device comprising a disguise for the eyes, including a frame, a transparent unitary eye-piece mounted in said frame, and the representation of an eyeball attached to the front face of the eye-piece and covering a central portion thereof.

3. An amusement device comprising a disguise for the eyes, including a frame, an eye-piece in said frame, and a raised artificial eye attached to the front face of the eye-piece substantially in the centre thereof, the portion of the eye-piece not covered by the artificial eye being transparent.

4. An amusement device comprising a disguise for the eyes, including a frame, a transparent eye-piece in said frame, and a raised representation of an eyeball adjustably mounted on the front face of the eye-piece.

5. The device claimed in claim 1, in which the representation of the eye-ball projects beyond the front face of the eye-piece.

6. An amusement device comprising a disguise for the eyes including a frame, a transparent eye-piece in said frame, and a raised representation of an eye-ball attached to the front face of the eye-piece and covering a central portion thereof.

In witness whereof I have hereunto set my hand.

FREDERICK GEORGE SCOTT.